United States Patent
Ramalingam et al.

(10) Patent No.: US 10,090,117 B1
(45) Date of Patent: Oct. 2, 2018

(54) METHOD OF MAKING A POROUS NANO-CARBON ELECTRODE FROM BIOMASS

(71) Applicant: KING SAUD UNIVERSITY, Riyadh (SA)

(72) Inventors: Jothi Ramalingam, Riyadh (SA); Siva Chidambaram, Chennai (IN); Judith Vijaya, Chennai (IN); Hamad Al-Lohedan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/872,892

(22) Filed: Jan. 16, 2018

(51) Int. Cl.
| | | |
|---|---|---|
| *H01G 11/34* | (2013.01) |
| *H01G 11/86* | (2013.01) |
| *H01G 11/26* | (2013.01) |
| *H01G 11/38* | (2013.01) |
| *B01J 21/18* | (2006.01) |
| *B05D 5/12* | (2006.01) |

(52) U.S. Cl.
CPC .............. *H01G 11/86* (2013.01); *H01G 11/26* (2013.01); *H01G 11/34* (2013.01); *H01G 11/38* (2013.01); *B01J 21/18* (2013.01); *B05D 5/12* (2013.01)

(58) Field of Classification Search
USPC .................................................. 427/115, 122
See application file for complete search history.

(56) References Cited

U.S. PATENT DOCUMENTS

| | | | | |
|---|---|---|---|---|
| 8,221,830 B2* | 7/2012 | Kim | ........................ | B82Y 30/00 427/113 |
| 8,252,716 B2* | 8/2012 | Gadkaree | ............... | H01G 11/34 423/445 R |
| 9,150,892 B2 | 10/2015 | Pandey et al. | | |
| 2007/0109722 A1* | 5/2007 | Ohmori | .................. | H01G 11/24 361/502 |

(Continued)

FOREIGN PATENT DOCUMENTS

CN          101591678 B          2/2012

OTHER PUBLICATIONS

Activated carbon from jackfruit peel waste by H3PO4 chemical activation: Pore structure and surface chemistry characterization (Year: 2008).*

(Continued)

*Primary Examiner* — Brian K Talbot
(74) *Attorney, Agent, or Firm* — Richard C. Litman

(57) ABSTRACT

The method of making a porous carbon electrode is a chemical activation-based method of making a porous nano-carbon electrode for supercapacitors and the like. Recycled jackfruit (*Artocarpus heterophyllus*) peel waste is used as a precursor carbon source for producing the porous nanocarbon. A volume of jackfruit (*Artocarpus heterophyllus*) peel is collected, dried and then heated under vacuum to produce precursor carbon. The precursor carbon is mixed with phosphoric acid ($H_3PO_4$) to form a mixture, which is then stirred, dried and heated to yield porous nanocarbon. The porous nanocarbon is mixed with a binder, such as poly(vinylidenedifluoride), acetylene black, and an organic solvent, such as n-methyl pyrrolidinone, to form a paste. This paste is then coated on a strip of nickel foil to form the porous carbon electrode.

8 Claims, 12 Drawing Sheets

(56) References Cited

U.S. PATENT DOCUMENTS

2016/0064735 A1* 3/2016 Tada .................. H01M 4/587
                                                                 429/221

OTHER PUBLICATIONS

Potential of jackfruit peel as precursor for activated carbon prepared by microwave induced NAOH activation (Year: 2012).*
Prahas et al., "Activated carbon from jackfruit peel waste by H3PO4 chemical activation: Pore structure and surface characterization," Chemical Engineering Journal, 2008, 140.
Foo et al., "Potential of jackfruit peel as precursor for activated carbon prepared by microwave induced NaOH activation," Bioresource Technology, 112, 2012, 143-150.
Shrestha et al., "Nanoporous carbon materials with enhanced supercapacitance performance and non-aromatic chemical sensing with C1/C2 alcohol discrimination," Science and Technology of Advanced Materials, 2016, vol. 17, No. 1, 483-492.

* cited by examiner

METHOD OF MAKING A POROUS NANO-CARBON ELECTRODE FROM BIOMASS

BACKGROUND

1. Field

The disclosure of the present patent application relates to electrode manufacture, and particularly to a method of making a porous carbon electrode for supercapacitors and the like utilizing recycled jackfruit (*Artocarpus heterophyllus*) peel waste as a carbon source.

2. Description of the Related Art

A supercapacitor (also referred to as an electric double-layer capacitor) is a high-capacity capacitor with capacitance values much higher than other capacitors, but with lower voltage limits, that bridge the gap between electrolytic capacitors and rechargeable batteries. Supercapacitors typically store 10 to 100 times more energy per unit volume or mass than electrolytic capacitors, can accept and deliver charge much faster than batteries, and tolerate many more charge and discharge cycles than rechargeable batteries. Unlike ordinary capacitors, supercapacitors do not use a conventional solid dielectric, rather, they use electrostatic double-layer capacitance and electrochemical pseudo-capacitance, both of which contribute to the total capacitance of the capacitor.

Electrostatic double-layer capacitors typically use carbon electrodes with much higher electrostatic double-layer capacitance than electrochemical pseudocapacitance, achieving separation of charge in a Helmholtz double layer at the interface between the surface of a conductive electrode and an electrolyte. The separation of charge is on the order of 0.3-0.8 nm, which is much smaller than that in a conventional capacitor. This extremely thin double-layer distance in a supercapacitor is made possible by the extremely large surface area of activated carbon electrodes. As is well known, activated carbon is a form of carbon processed to have small, low-volume pores that increase the surface area available for adsorption or chemical reactions. Due to its high degree of microporosity, just one gram of activated carbon has a surface area in excess of 3,000 $m^2$.

Solid activated carbon, also sometimes referred to as consolidated amorphous carbon (CAC), is the most commonly used electrode material for supercapacitors. It is produced from activated carbon powder pressed into the desired shape, forming a block with a wide distribution of pore sizes. An electrode with a surface area of about 1000 $m^2/g$ results in a typical double-layer capacitance of about 10 $\mu F/cm^2$ and a specific capacitance of 100 F/g. One of the most common sources for powdered activated carbon used in supercapacitors is coconut shells. Although coconut shells produce activated carbon with more micropores than that made from wood charcoal, the relative availability of coconuts in non-tropical regions makes coconut shells an expensive carbon precursor source. Additionally, the conversion process of coconut shells to activated carbon of sufficient purity for supercapacitor manufacture can be both expensive, time consuming and complex. Thus, a method of making a porous carbon electrode solving the aforementioned problems is desired.

SUMMARY

The method of making a porous carbon electrode is a chemical activation-based method of making a porous nano-carbon electrode for supercapacitors and the like. Jackfruit (*Artocarpus heterophyllus*) peel waste is used as a precursor biomass carbon source for producing the porous nanocarbon. A volume of jackfruit (*Artocarpus heterophyllus*) peel is collected, dried and then heated under vacuum to produce precursor carbon. The precursor carbon is mixed with phosphoric acid ($H_3PO_4$) to form a mixture, which is then stirred, dried and heated to yield porous nanocarbon. The porous nanocarbon is mixed with a binder, such as poly(vinylidenedifluoride), acetylene black, and an organic solvent, such as n-methyl pyrrolidinone, to form a paste. This paste is then coated on a strip of nickel foil to form the porous carbon electrode. During the activation step, the mixture is heated at a temperature between 600° C. and 900° C. for 4 hours under vacuum, with a preferred temperature of approximately 900° C.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
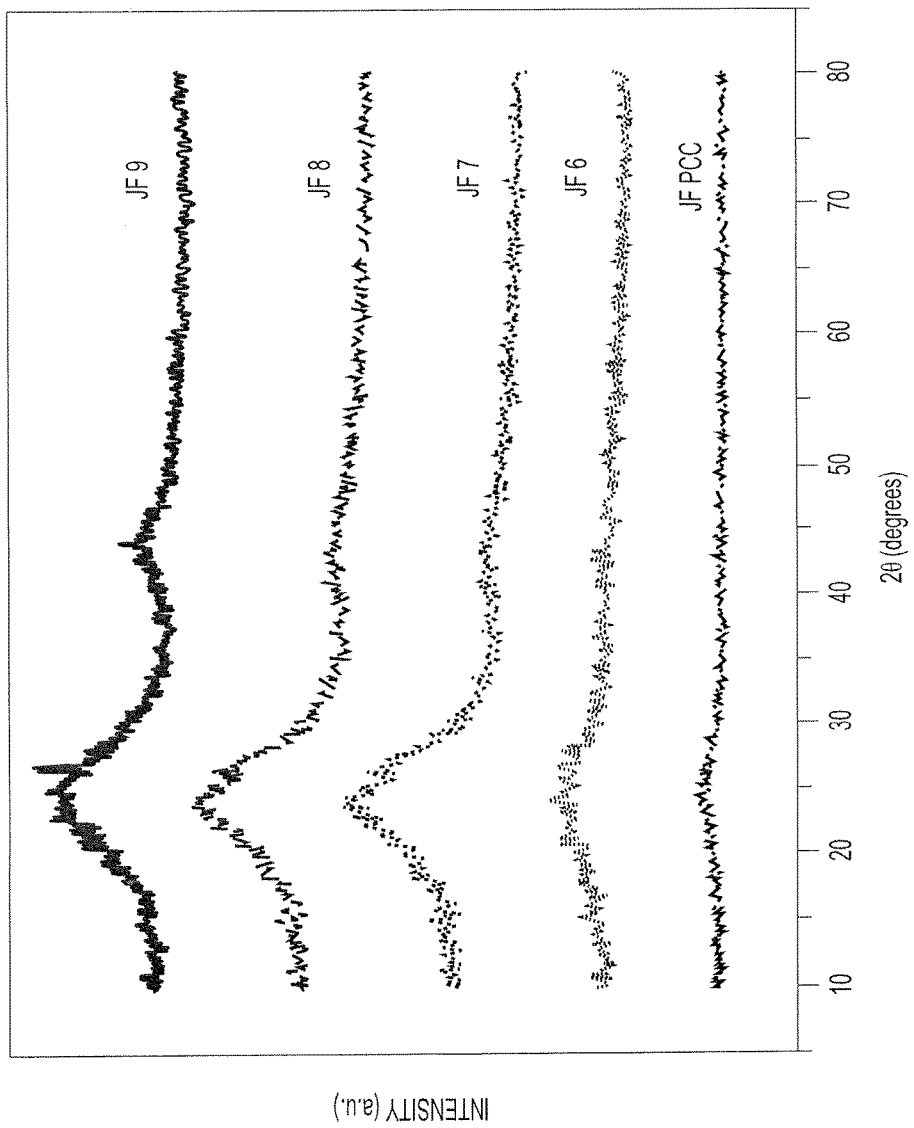
FIG. 1 is a graph comparing X-ray diffraction spectra (XRD) results for porous nanocarbon samples produced by a method of making a porous carbon electrode, specifically comparing a pre-carbonized carbon sample (JF-PCC) against samples prepared with activation temperatures of 600° C. (JF 6), 700° C. (JF 7), 800° C. (JF 8) and 900° C. (JF 9).

The method of making a porous carbon electrode is a chemical activation-based method of making a porous nanocarbon electrode for supercapacitors using jackfruit (*Artocarpus heterophyllus*) peel waste as a precursor carbon source for producing the porous nanocarbon. The method includes collecting a volume of jackfruit (*Artocarpus heterophyllus*) peel. The jackfruit peel can then be dried and heated under vacuum to produce the precursor carbon. For example, the jackfruit peel can be dried for a period of about 24 hours at a temperature of about 80° C. and heated at a temperature of about 400° C. for about 4 hours under vacuum. The precursor carbon is mixed with phosphoric acid ($H_3PO_4$) to form a mixture, which is then stirred, dried and heated to yield porous nanocarbon. For example, the mixture can be stirred for about 3 hours at a temperature of about 80° C. and heated at a temperature ranging from about 600° C. to about 900° C. for about 4 hours under vacuum. The porous nanocarbon is mixed with a binder, such as poly(vinylidenedifluoride), acetylene black, and an organic solvent, such as n-methyl pyrrolidinone, to form a paste. This paste is then coated on a strip of nickel foil to form the porous carbon electrode.

In order to prepare sample porous carbon electrodes using the method of making a porous carbon electrode, jackfruit peel waste (JPW) was collected from villages in the Villupuram district of Tamil Nadu, India. The JPW raw material was cut into small pieces and washed several times to remove impurities, such as sand. After washing the JPW, it was dried for 24 hours at a temperature of 80° C. The dried JPW raw material was then transferred to a graphite crucible and sealed by clay molding. The clay molded graphite crucible was placed in a muffle furnace at a temperature of 400° C. for 4 hours under vacuum conditions. Lastly, the pre-carbonized carbon (PCC) sample was collected from the graphite crucible by breaking the molded clay using a hammer. For purposes of testing and analysis, as will be described in greater detail below, the sample was labelled as JF-PCC.

Subsequently, 20 g of the PCC was mixed with $H_3PO_4$ as an activating agent, in a ratio of 1:4. The mixed solution was stirred for 3 hours at 80° C. After stirring, the sample was filtered and dried at 80° C. for 24 hours. The dried sample was partially divided into four parts, and each sample was transferred in a separate clay molded graphite crucible. The clay molded graphite crucible was placed in a muffle furnace at different temperatures (600° C., 700° C., 800° C. and 900° C.) for 4 hours under vacuum conditions. After maintaining the temperature for this fixed time, the clay molded graphite crucible was taken out of the muffle furnace and cooled at room temperature. The molded clay was broken using a hammer and samples were collected. The four collected samples were washed several times using distilled water to maintain a neutral pH and then dried at 80° C. for 24 hours. For purposes of testing and analysis, as will be described in greater detail below, four samples of JPW porous nanocarbon were respectively labeled JF 6, JF 7, JF 8 and JF 9.

The carbon electrode was prepared by mixing 16 mg of the JPW porous nanocarbon (prepared as described above) with 2 mg of a poly(vinylidenedifluoride) binder, which was further mixed with 2 mg of acetylene black to enhance capacitive nature (by avoiding the resistance present in the binder). A few drops of n-methyl pyrrolidinone were added as an organic solvent, and the mixture was made into a paste. The paste was coated on a nickel foil strip (1 cm×1 cm), thus forming a sample current collector electrode.

The JPW porous nanocarbon electrode was analyzed using electrochemical measurements, such as cyclic voltammetry (CV), galvanostatic charge-discharge (GCD), electrochemical impedance spectroscopy (EIS), along with a test of the cyclic stability (5000 cycles) using a standard three-electrode system in a 1 M $Na_2SO_4$ electrolyte using Ametek PARSTAT 4000. As is well known, in the three-electrode system, one electrode is the working electrode (the as-prepared porous nanocarbon sample electrode), the second electrode is a counter electrode (a platinum electrode used to maintain the electroneutrality in the electrochemical cell), and the third electrode is a reference electrode (Ag/AgCl).

The amorphous nature of the porous nanocarbon was observed with X-ray diffraction spectra (XRD) studies using a X-ray diffractometer with a Cu Kα radiation source ($\lambda=1.5406$ Å) in a scanning angle range of 10° to 90°, and at scanning rate of 10°/min at 40 mA and 40 kV. The XRD patterns of the prepared JPW porous nanocarbon (PC) samples are shown in FIG. 1. Two peaks can be observed for the JF 7, JF 8 and JF 9 samples at a 2θ of about 23° (100 plane) and at about 43° (101 plane). The sharp peak at 26° (002 plane) demonstrates the graphitic features of the JF 9 sample, which also matches that of the Joint Committee on Powder Diffraction Standards (JCPDS) card number 75-2078. This is known to enhance the electrochemical performance of electrode materials. Generally, the prepared porous nanocarbon was almost amorphous. The PC materials prepared at a low carbonizing temperature (JF-PCC at 400° C.) had no broadening at a 2θ of about 23°. However, sharp peaks appeared in the JF 9 samples at 26° and 43°, indicating that the impurities may have been burnt by $H_3PO_4$, and also explaining why the JF 9 sample is more graphitic in nature than the other samples (JF 8, JF 7 and JF 6). JF 6 was prepared at a low activation temperature (600° C.) and shows a small broadening at a 2θ around 23° because it is the initial stage of porous formation in the activation process, clearly showing the JF 6 to be amorphous in nature. Further, when the activation temperature increases, the broadness and intensity of the peaks at a 2θ around 23° and 43° also increases. Thus, the activation temperature is seen to be important in the conversion from an amorphous nature to a graphitic nature.

Figure 2:
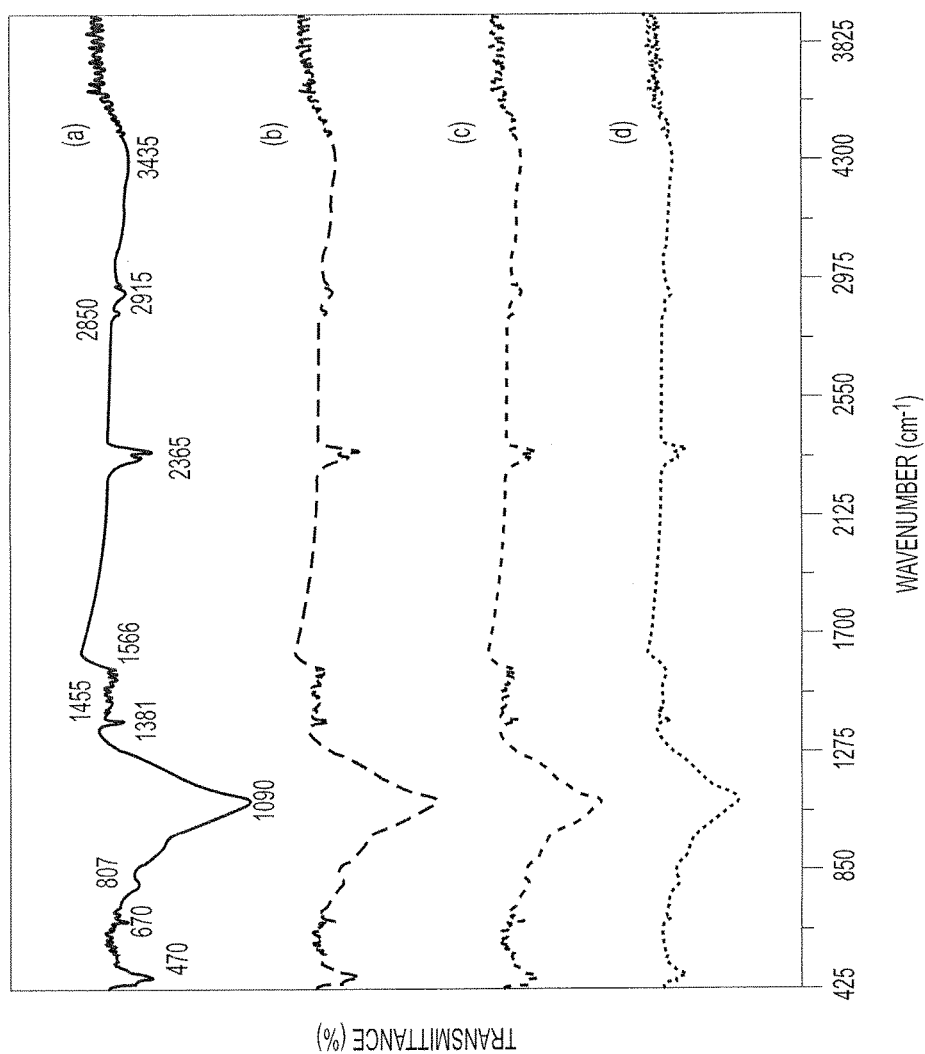
FIG. 2 is a graph comparing Fourier transform-infrared (FTIR) results for samples JF 6 (curve a), JF 7 (curve b), JF 8 (curve c) and JF 9 (curve d).

Fourier transform-infrared (FTIR) analysis was used to identify the presence of surface functional groups in the JPW porous nanocarbon and carbonized samples. The analysis was conducted with a spectrophotometer based on the KBr disk procedure. The spectral data of the samples were recorded in a wavenumber range of 4000 $cm^{-1}$ to 400 $cm^{-1}$. FIG. 2 illustrates the FTIR spectra of the JPW porous nanocarbon samples JF 6 (curve a), JF 7 (curve b), JF 8 (curve c) and JF 9 (curve d). All of the JPW porous nanocarbon samples show similar peak results, indicating that all of the samples were activated by the $H_3PO_4$. The shoulder at 1090 cm$^{-1}$ can be ascribed to the ionized linkage P$^+$—O$^-$ in acid phosphate esters and to the symmetrical vibration in a chain of P—O—P (polyphosphate). The absorption at 1381 cm$^{-1}$ shows a C—O stretch, and the functional groups present are alcohol, carboxylic acid, esters and ethers. The peaks at 3435 cm$^{-1}$ and 750 cm$^{-1}$ indicate the presence of O—H, carboxylic group stretching vibration, and Si—H bonds in the PC samples. The peak at 1566 cm$^{-1}$ belongs to the aromatic C═C stretching. The absorption at 1455 cm$^{-1}$ shows the presence of alkanes (C—H bond). The presence of the surface functional groups in the JPW porous nanocarbon may be due to the phosphoric acid activation.

Figure 3A:
FIG. 3A is a high-resolution scanning electron microscope (HR-SEM) image of the JF-PCC sample.
Figure 3B:
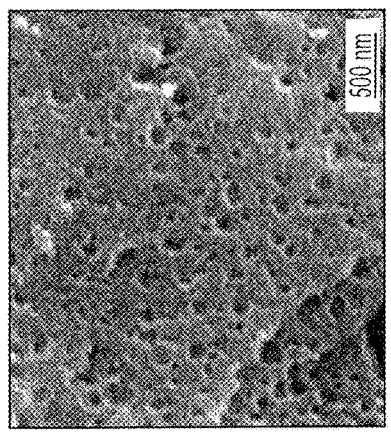
FIG. 3B is a high-resolution scanning electron microscope (HR-SEM) image of the JF 6 sample.
Figure 3C:
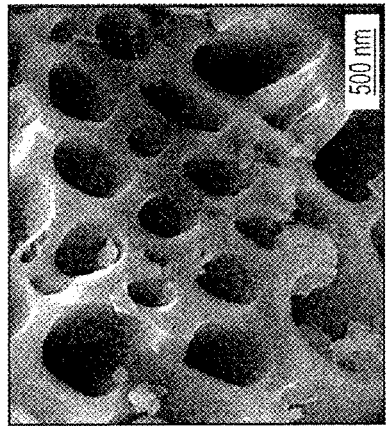
FIG. 3C is a high-resolution scanning electron microscope (HR-SEM) image of the JF 9 sample.

The morphology and microstructure of the porous nanocarbon was observed by a scanning electron microscope (SEM) and a high-resolution transmission electron microscope (HRTEM). HR-SEM micrographs of the JPW porous nanocarbon samples are shown in FIGS. 3A, 3B and 3C. The JF-PCC sample has a relatively rough surface and shows an absence of porosity on the surface, as shown in FIG. 3A. The number of pores appears to increase with an increase in the temperature on the activation process. The number of pores on the surface of sample JF 9 (900° C.), as shown in FIG. 3C, can be seen be much greater than that of sample JF 6 (600° C.), as shown in FIG. 3B. This increase may be caused by the activating agent H$_3$PO$_4$, which burnt more carbon to produce more pores. In FIG. 3B, sample JF 6 shows smaller pores than those of sample JF 9 (FIG. 3C), and it can be clearly seen that sample JF 6 is microporous in nature. Comparatively, sample JF 9 has an enlargement of the pores, showing both a microporous and a mesoporous nature. Similarly, sample JF 6 shows a smoother surface with a lower degree of porosity when compared to sample JF 9, which shows hierarchical and irregular pores (as shown in FIG. 3C). These differences may be attributed to the contribution of the H$_3$PO$_4$, which reacts both with the interior and exterior surfaces of sample JF 9, thus creating more pores on the surface. It can be further seen in FIG. 3C that the sample carbonized at 900° C. exhibits cylindrical-like pores. More porous creation enhances the BET surface area, and this is made further evident by the results of an N$_2$ adsorption-desorption isotherm analysis (as described below with reference to Table 1). Additionally, the JF 9 sample exhibits pore channels that are interconnected, as seen in FIG. 3C. This is a desirable property because the interconnected channels are very important for charge transfer in electrochemical double layer capacitors (EDLCs).

Figure 3D:
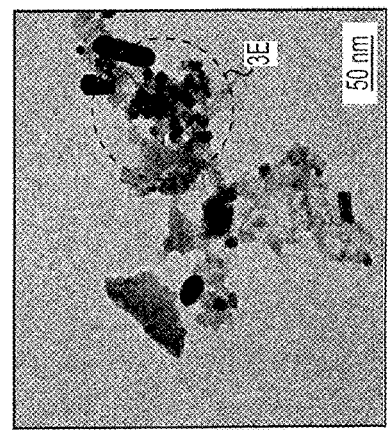
FIG. 3D is a high-resolution transmission electron microscope (HRTEM) of the JF 9 sample.
Figure 3E:
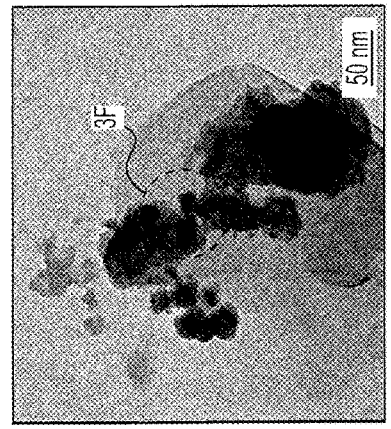
FIG. 3E is a high-resolution transmission electron microscope (HRTEM) of region 3E of FIG. 3D of the JF 9 sample.
Figure 3F:
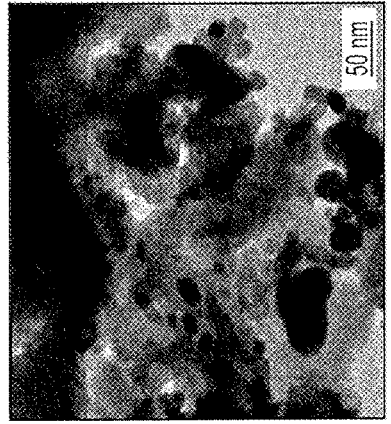
FIG. 3F is a high-resolution transmission electron microscope (HRTEM) of region 3F of FIG. 3E of the JF 9 sample.

Furthermore, the morphological and structural studies of the JF 9 sample were examined by the HR-TEM, which show a spongy and glassy layered nanotube structure of graphitic porous nanocarbon materials (as seen in FIGS. 3D and 3E). The graphitic nature of the JPW porous nanocarbon samples was further deeply magnified, and this depicted an agglomerated spherical nanoball-like morphology, as shown in FIG. 3F. This type of interconnected spherical nanoball porous activated carbon provides a unique open pore system with a high active surface area and a short diffusion path for electrolyte ions. Such a structure should provide for an enhanced supercapacitor. The different morphological properties described above may be used for improving electrochemical performance of electrode materials for energy storage applications.

Figure 4:
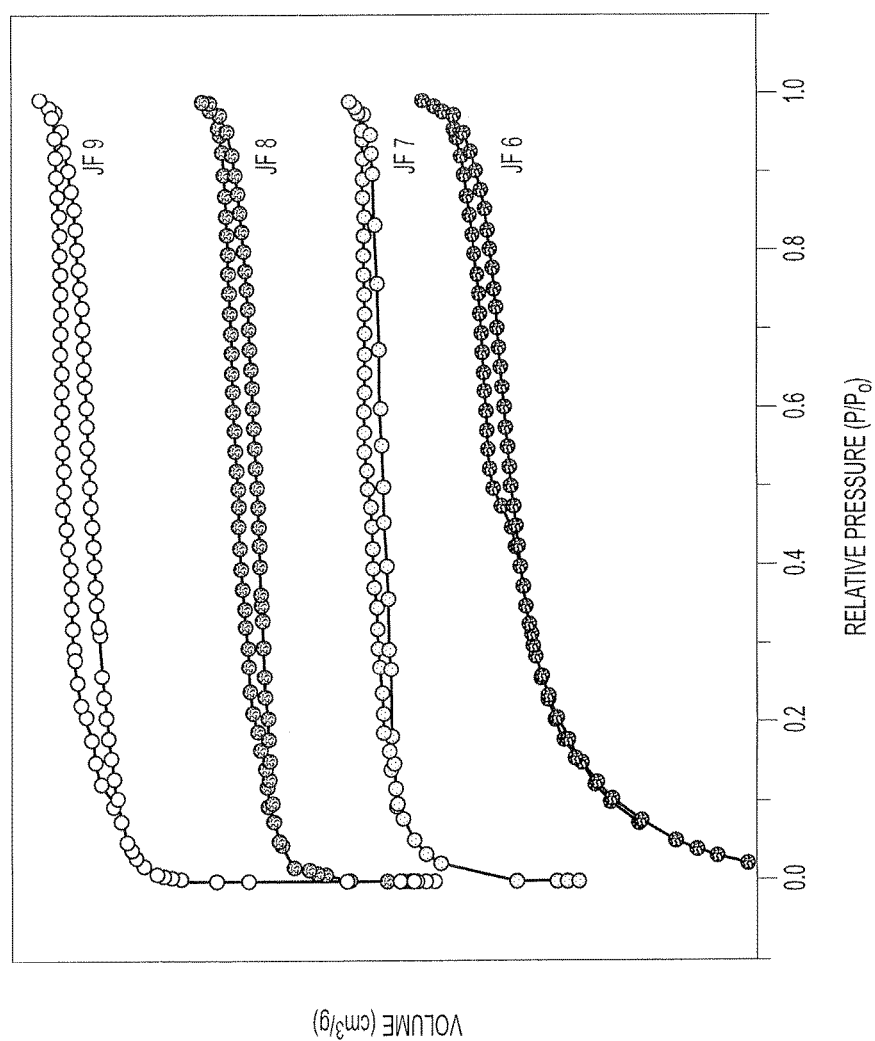
FIG. 4 is a graph comparing $N_2$ adsorption-desorption results for samples JF 6, JF 7, JF 8 and JF 9.

The pore structure and Brunauer-Emmett-Teller (BET) surface area were analyzed using the nitrogen adsorption-desorption isotherms, taken at 77 K. FIG. 4 shows the nitrogen adsorption-desorption isotherms at 77 K for samples JF 6, JF 7, JF 8 and JF 9 having BET surface areas of 689 m$^2$/g, 984 m$^2$/g, 1260 m$^2$/g and 1585 m$^2$/g, respectively, as shown below in Table 1. Sample JF 6 (600° C.) shows type I nitrogen isotherms, according to the International Union of Pure and Applied Chemistry (IUPAC) classification, thus characterizing sample JF 6 as a microporous material. Samples JF 7 (700° C.), JF 8 (800° C.) and JF 9 (900° C.) showed a 1-13 hysteresis loop, which is a typical type IV isotherm, indicating a large amount of micro and mesopores. The isotherms show a sharp increase of nitrogen uptake at a very low relative pressure and an almost horizontal plateau for sample JF 6, which presents a lower BET surface area than those of samples JF 7, JF 8 and JF 9. Sample JF 9 shows a larger adsorption-desorption hysteresis loop than those of the other three samples, which indicates that sample JF 9 has higher microporosity and mesoporosity (0.635 and 0.330 cm$^3$/g, respectively) than that of sample JF 6 (0.301 and 0.194 cm$^3$/g, respectively), sample JF 7 (0.435 and 0.229 cm$^3$/g, respectively) and sample JF 8 (0.571 and 0.298 cm$^3$/g, respectively), as shown below in Table 1.

Sample JF 9 also shows a higher N$_2$ adsorption due to the higher BET surface area and larger total pore volume (0.965 cm$^3$/g). In the chemical activation using H$_3$PO$_4$ as the activating agent, at the higher temperature of 900° C., the reaction between the H$_3$PO$_4$ and carbon occurs. Then, phosphorous intercalates into the carbon matrix, resulting in the widening of the spaces between the carbon atomic layers and increasing the total pore volume. With an increase in temperature, a maximum widening of micropores to mesopores occurs. This can also be performed by the chemical activation using H$_3$PO$_4$ in order to maximize the pore width in the activated carbon, in the range of 0 nm to 20 nm, as shown in FIG. 5.

Figure 5:
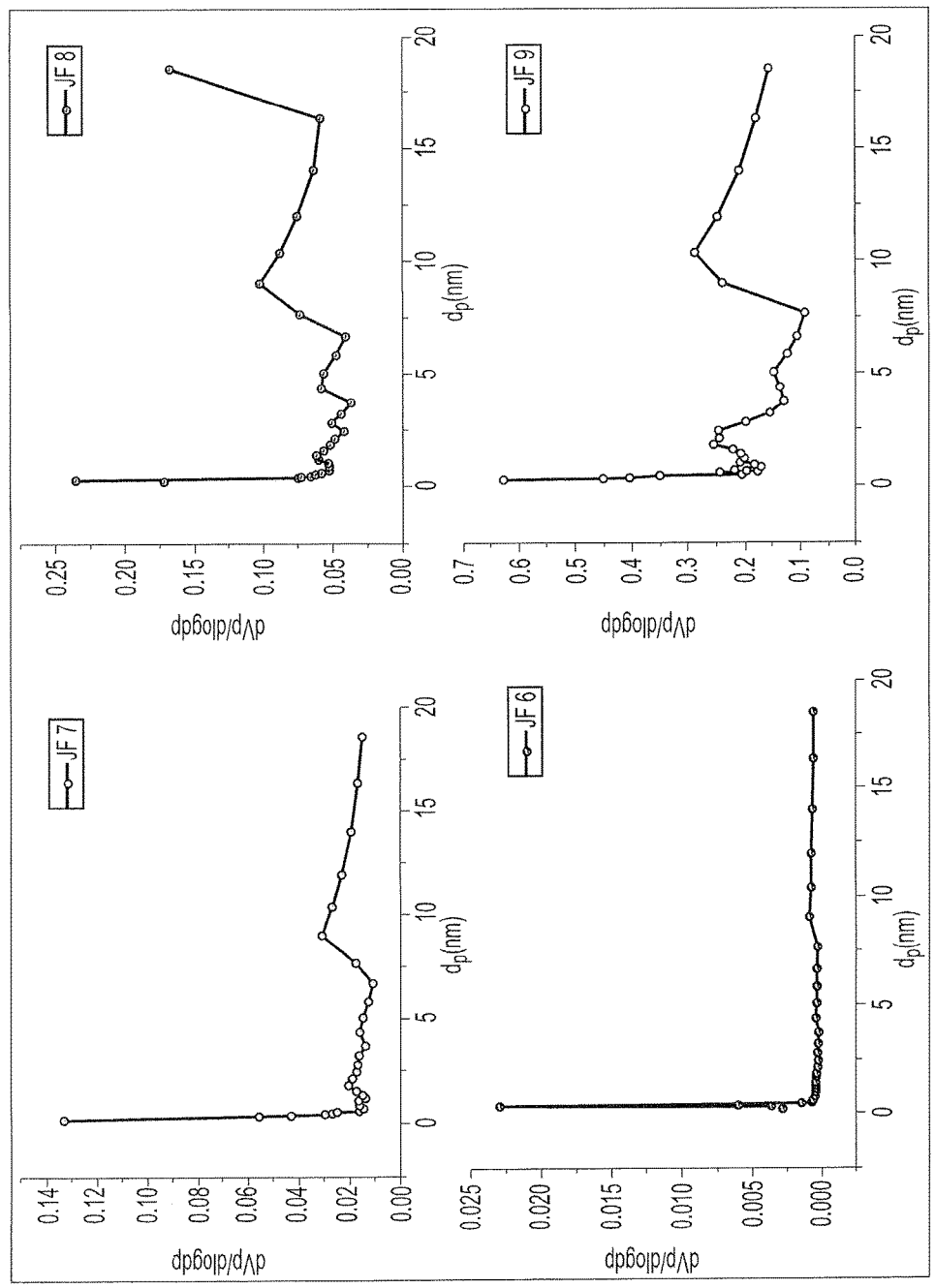
FIG. 5 shows a comparison of pore size distribution for samples JF 6, JF 7, JF 8 and JF 9.
Figure 6B:
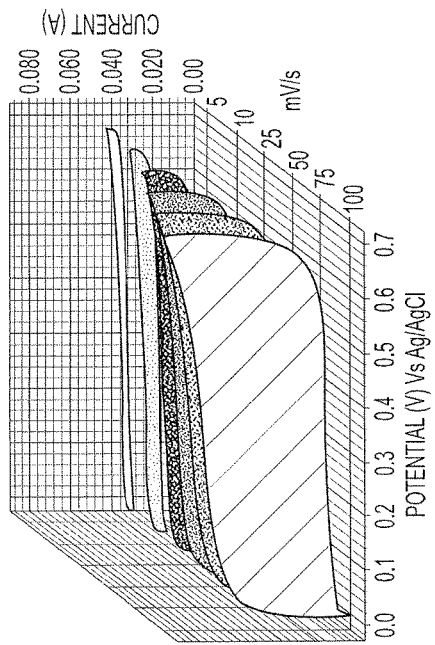
FIG. 6B shows cyclic voltammetry curves for sample JF 7 for differing scan rates.
Figure 6D:
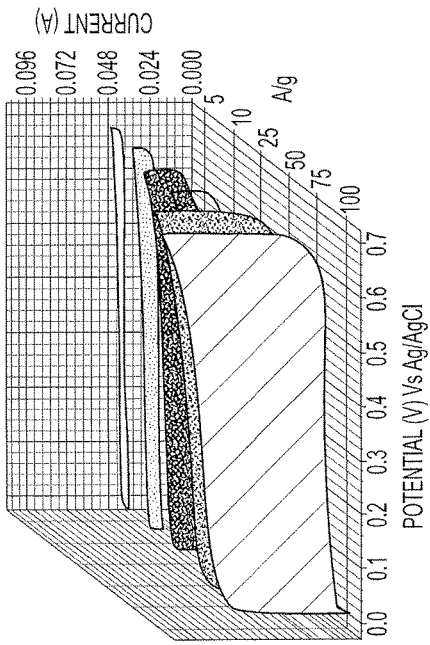
FIG. 6D shows cyclic voltammetry curves for sample JF 9 for differing scan rates.
Figure 6A:
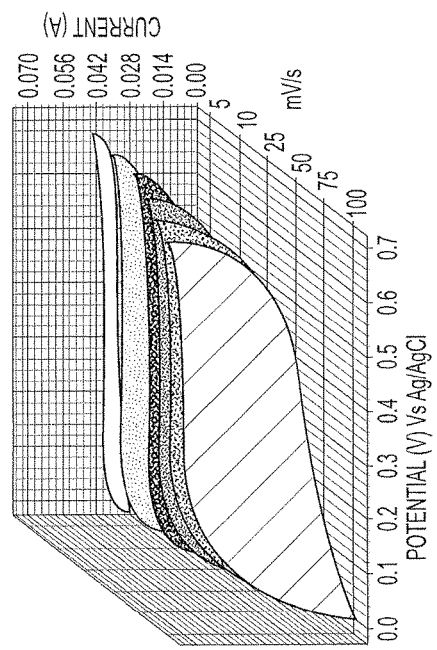
FIG. 6A shows cyclic voltammetry curves for sample JF 6 for differing scan rates.
Figure 6C:
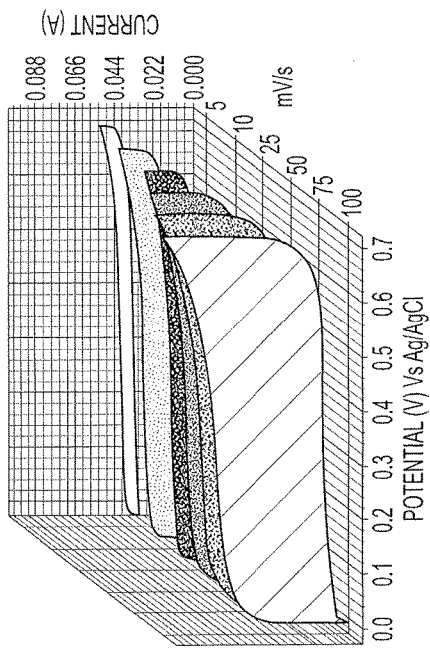
FIG. 6C shows cyclic voltammetry curves for sample JF 8 for differing scan rates.

FIG. 5 shows the pore size distributions for the JF 6, JF 7, JF 8 and JF 9 porous nanocarbon samples. Most of the pores from sample JF 6 are smaller than 2 nm. The pore width range increases when the temperature increases (<4 nm for sample JF 7, <5 nm for sample JF 8, and <10 nm for sample JF 9). This result indicates that the H$_3$PO$_4$ activation process brings a higher specific surface area and total pore volume for the JF 9 sample. Thus, it can be concluded that the JF 9 sample has a hierarchical pore structure with the interconnected large pores and abundant micropores and mesopores. Such a porous structure should improve the electrochemical energy storage because the large pores and mesopores are helpful for ion diffusion, and the micropores are efficient for accumulating charge. The high specific surface area and total pore volume of the JF 9 sample should contribute in the development of high EDLC, charge storage and ion transport, and should be advantageous in capacitance performance when used in supercapacitor applications. For samples JF 6, JF 7, JF 8 and JF 9, Table 1 below shows the BET surface area ($S_{BET}$), the micropore surface area ($S_{micro}$), the mesopore surface area ($S_{meso}$), the micropore volume ($V_{micro}$), the mesopore volume ($V_{meso}$), and the total pore volume ($V_{Total}$).

TABLE 1

Pore Structure and BET Surface Area

| Sample | $S_{BET}$ (m$^2$/g) | $S_{micro}$ (m$^2$/g) | $S_{meso}$ (m$^2$/g) | $V_{micro}$ (cm$^3$/g) | $V_{meso}$ (cm$^3$/g) | $V_{Total}$ (cm$^3$/g) |
|---|---|---|---|---|---|---|
| JF 6 | 689 | 492 | 197 | 0.301 | 0.194 | 0.495 |
| JF 7 | 984 | 637 | 347 | 0.435 | 0.229 | 0.664 |
| JF 8 | 1260 | 823 | 437 | 0.571 | 0.298 | 0.869 |
| JF 9 | 1585 | 993 | 592 | 0.635 | 0.330 | 0.965 |

Cyclic voltammetry (CV) was used to evaluate the electrochemical performance of the JPW porous nanocarbon samples using a standard three-electrode electrochemical system (a JPW porous nanocarbon working electrode, an Ag/AgCl reference electrode, and a platinum wire used as a counter electrode) in a 1 M $Na_2SO_4$ aqueous electrolyte, with a potential window ranging from 0 V to 0.68 V, as shown in FIGS. 6A-6D. FIGS. 6A-6D represent the CV curves of samples JF 6, JF 7, JF 8 and JF 9, respectively, with different scan rates of 5 mV/s to 100 mV/s. Generally, the ideal electrochemical active electrode material shows a rectangular CV shape. The CV profiles of samples JF 6 and JF 7 show a lesser and quasi-rectangular shape (FIGS. 6A and 6B, respectively), thus indicating their lower supercapacitive behavior. $N_2$ adsorption-desorption analysis of samples JF 8 and JF 9 shows high BET surface area with hierarchical (both microporous and mesoporous) nature. High porosity creates the strong double layer formation, electrostatically. This reason is clearly shown in the CV curves of samples JF 8 and JF 9, which have ideal rectangular shapes, indicating an improved supercapacitive performance. Further, a nearly symmetrical box-like shape of the CV curves of the JF 9 sample can be seen in FIG. 6D, demonstrating an ideal supercapacitive performance. Following CV testing, the specific capacitance was calculated as:

$$C_s = \int \frac{\Delta I}{2Vm(v_2 - v_1)} dV, \quad (1)$$

where $\Delta I = I_a - I_c$, $C_s$ represents specific capacitance, $$\frac{\Delta I}{2}$$

represents flair or me integration area of the CV curve, $I_a$ is the anodic current, $I_c$ is the cathodic current, V is the scan rate, and m represents the active material mass present in the working electrode. The calculated specific capacitance is given in Table 2 below. In Table 2, the calculated $C_s$ values are shown at different san rates (5 mV/s to 100 mV/s), and when the scan rate increases, the $C_s$ values can be seen to decrease for all samples. At a low scan rate of 5 mV/s, the JF 9 sample shows good charge propagation, quick ion diffusion within the pores, lesser contact resistance and fast re-organizing of the electrical double layer at the switching potentials. These results indicate that with the increase in temperature, the porosity increases rapidly from sample JF 6 to sample JF 9. Due to this reason, sample JF 9 shows a higher BET surface area (1585 $m^2/g$) with large storage sites, since it is produced at a high current range in the y-axis, as well as the above noted ideal rectangular shape in the CV curve, particularly when compared with the other JPW porous nanocarbon samples.

TABLE 2

| | Specific Capacitance | | | | | | | | | |
|---|---|---|---|---|---|---|---|---|---|---|
| | Specific Capacitance Calculated from CV (F/g) | | | | | | | Specific Capacitance Calculated from GCD (F/g) | | |
| | 5 | 10 | 20 | 25 | 50 | 75 | 100 | | | |
| Samples | mV/s | mV/s | mV/s | mV/s | mV/s | mV/s | mV/s | 1 A/g | 3 A/g | 5 A/g |
| JF 6 | 168 | 155 | 142 | 126 | 111 | 102 | 88 | 165 | 142 | 120 |
| JF 7 | 205 | 195 | 174 | 155 | 137 | 113 | 97 | 203 | 175 | 144 |
| JF 8 | 268 | 242 | 223 | 206 | 181 | 162 | 136 | 294 | 256 | 213 |
| JF 9 | 324 | 305 | 283 | 275 | 252 | 238 | 214 | 320 | 297 | 274 |

Figure 7A:
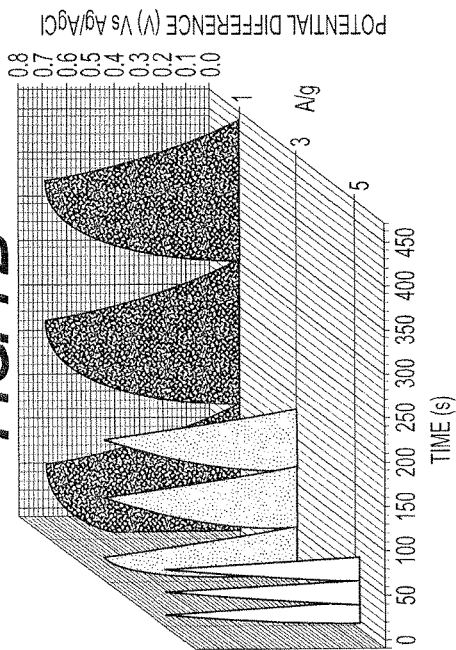
FIG. 7A shows galvanostatic charge-discharge curves for sample JF 6 for current densities of 1 A/g, 3 A/g and 5 A/g.
Figure 7B:
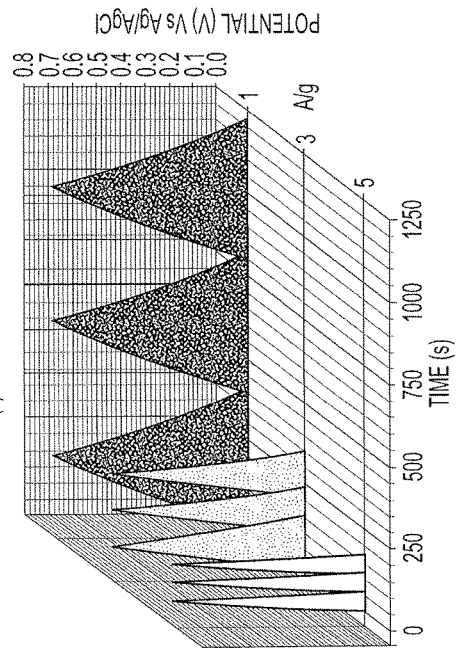
FIG. 7B shows galvanostatic charge-discharge curves for sample JF 7 for current densities of 1 A/g, 3 A/g and 5 A/g.
Figure 7C:
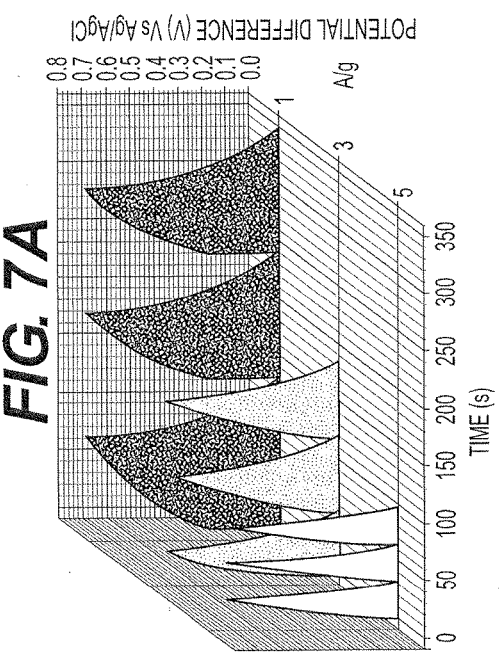
FIG. 7C shows galvanostatic charge-discharge curves for sample JF 8 for current densities of 1 A/g, 3 A/g and 5 A/g.
Figure 7D:
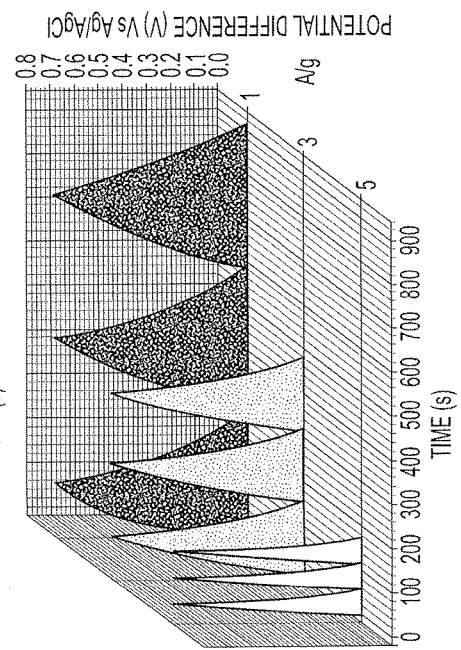
FIG. 7D shows galvanostatic charge-discharge curves for sample JF 9 for current densities of 1 A/g, 3 A/g and 5 A/g.

The samples were further tested by galvanotactic charge-discharge (GCD) at different current densities (1, 3 and 5 A/g), as shown in FIGS. 7A-7D. All of the JPW porous nanocarbon samples have a triangular shaped curve but, as shown in FIG. 7A, sample JF 6 has a small slanting portion in the triangle at low current density (1 A/g) with a slight IR drop and with low internal resistance. Similarly, sample JF 7 (FIG. 7B) and sample JF 8 (FIG. 7C) each have a very slight slanting portion, indicating a small internal resistance. However, as shown in FIG. 7D, sample JF 9 exhibits approximately linear lines with obvious sharp triangular shapes at low and high current densities. This indicates that sample JF 9 has very good capacitive behavior when compared with the other samples. The $C_s$ value was calculated from the GCD as:

$$C_s = \frac{I \times \Delta t \times \Delta V}{m}, \quad (2)$$

where $C_s$ is the specific capacitance (F/g), I is the current density (A/g), $\Delta t$ is the charge-discharge time (s), m is the mass of the active material (g), and $\Delta V$ is the working potential window of the electrode (V/s). The $C_s$ values from GCD are in good agreement with the $C_s$ values from CV, as shown above in Table 2.

Figure 8:
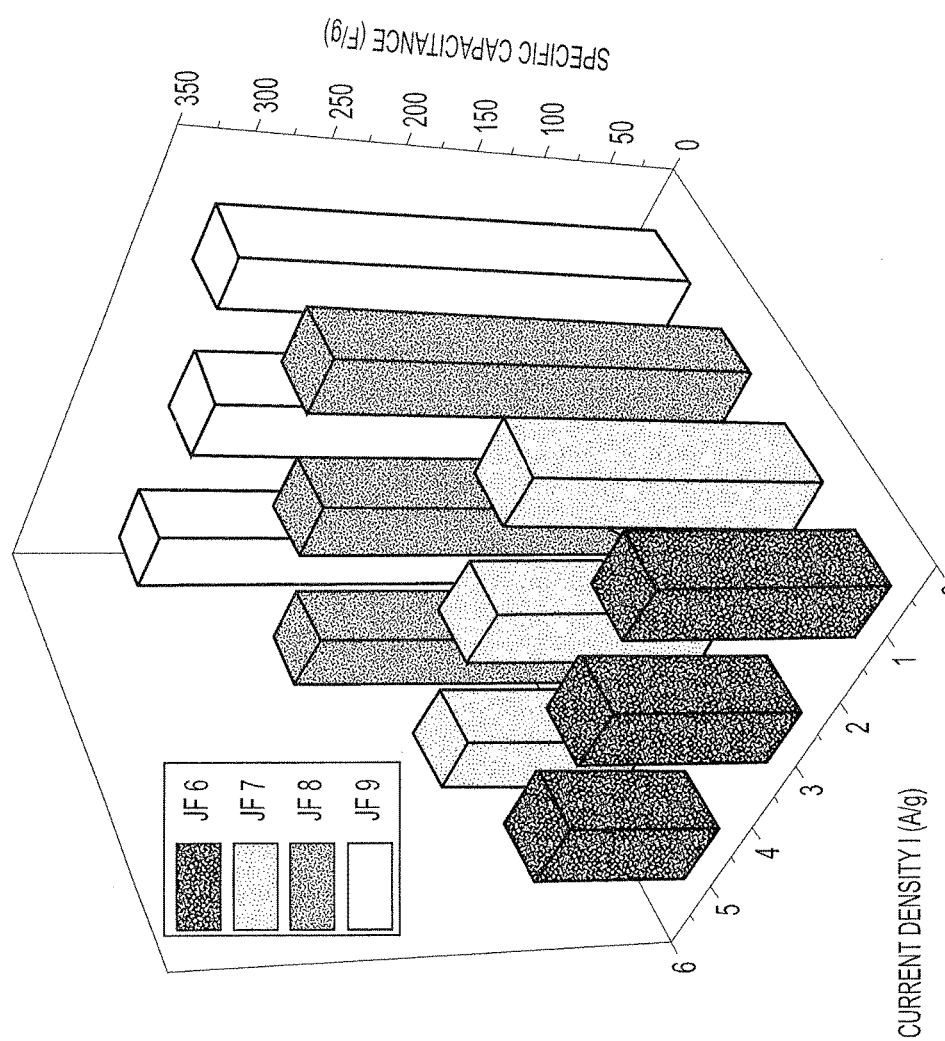
FIG. 8 shows a comparison of specific capacitance as a function of current density at differing scan rates for samples JF 6, JF 7, JF 8 and JF 9.

Porous nanocarbons with microporous and mesoporous structures not only improve the specific capacitance of supercapacitors, but also enhance the rate performance of current density in supercapacitors. FIG. 8 shows the different current densities for the specific capacitance values of the JPW porous nanocarbon samples. As the rate of current density decreases, the $C_s$ value increases, and as the rate of current density increases, the $C_s$ value decreases, as shown above in Table 2. Since sample JF 9 has a large number of microporous and mesoporous structures, this aids the electrolyte ions in being transferred at a high charge-discharge rate, with a reduction in the diffusion time of the electrolyte ions. Thus, the supercapacitor retains a high specific capacitance at a high current density. Table 2 shows that the JF 9 sample has a specific capacitance of 274 F/g at the high current density of 5 A/g, and a specific capacitance of 320 F/g at low current densities (1 A/g). The $C_s$ value of sample JF indicates that the low current density attains the higher charge-discharge time intervals because of the stronger interaction at the double layer interface between the electrode and electrolytes. Comparatively, the other samples display lower time intervals for each cycle at low current densities, which may be due to the lower BET surface area, where the double layer interaction becomes very weak in between the electrode and electrolyte interfaces. This result indicates that the JF 9 electrode material has good charge-discharge rate performance in EDLCs.

Figure 9A:
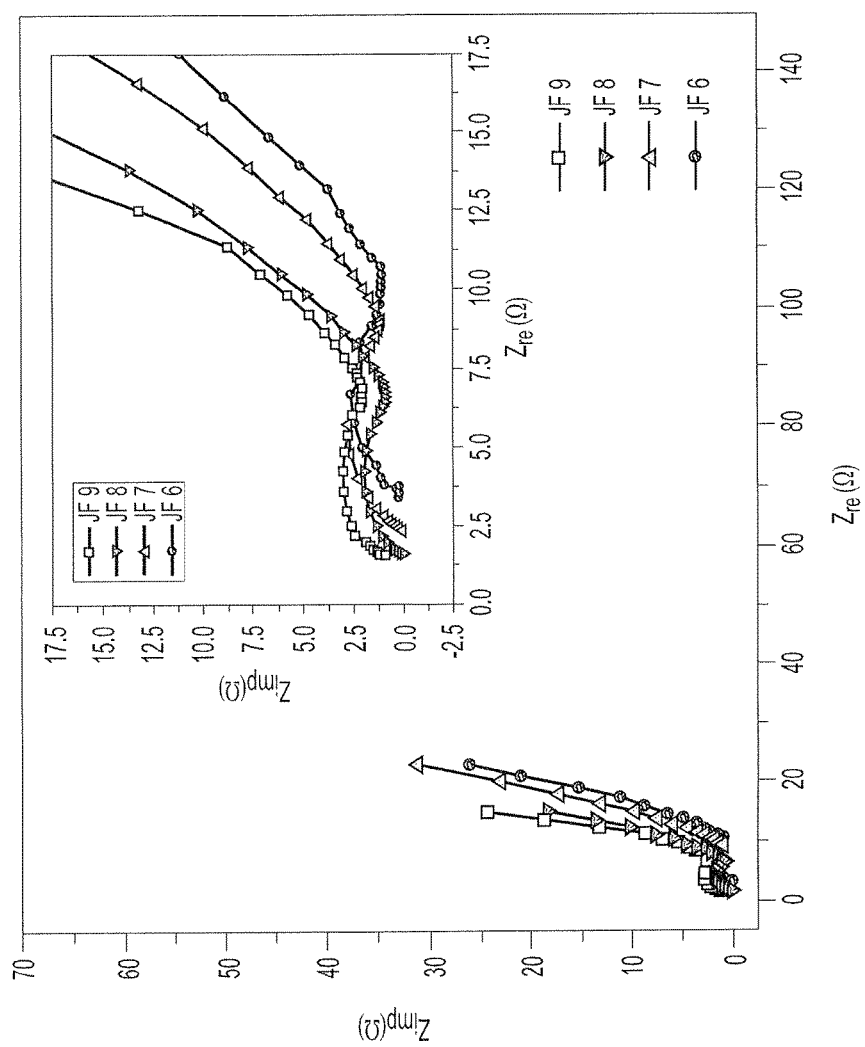
FIG. 9A is compares Nyquist plots for samples JF 6, JF 7, JF 8 and JF 9 using a sinusoidal signal of 5 mV over a frequency range of 0.1-100 kHz.
Figure 9B:
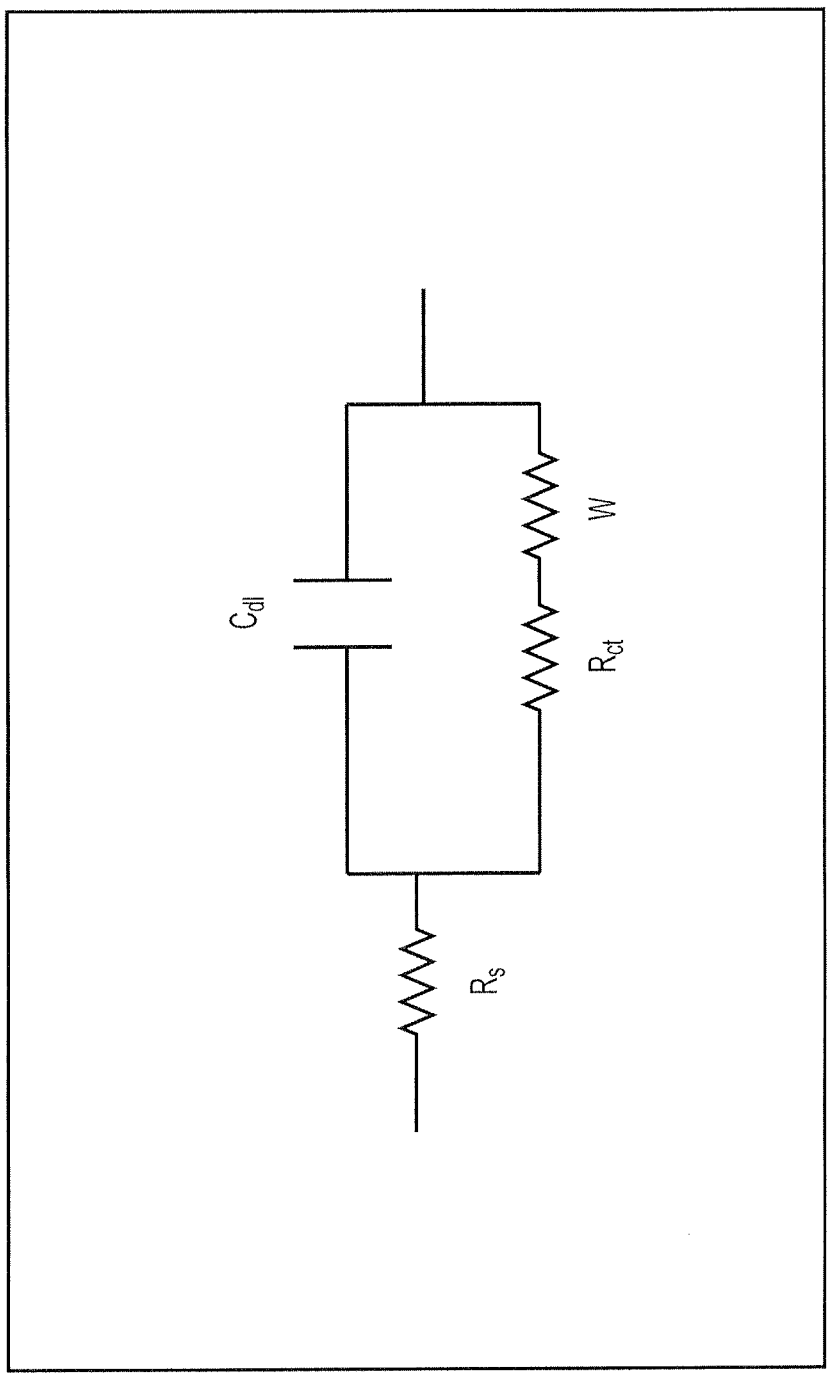
FIG. 9B is a schematic diagram illustrating an equivalent circuit used for testing the electrochemical impedance spectra (EIS) of FIG. 9A.

Electrochemical impedance spectra (EIS) was used to study the electrochemical properties of the JPW porous nanocarbon materials, and these were used to test the electronic resistance in the electrode and electrolyte interfaces of supercapacitors. The Nyquist plots of the porous nanocarbon samples in 1 M $Na_2SO_4$ electrolytes are shown in FIG. 9A. The Nyquist plots show the impedances over a frequency range of 0.1-100 kHz and at an open circuit potential of 5 mV. The fitted equivalent circuit diagram of FIG. 9B includes the resistivity system, including $R_s$, $R_{ct}$ and W, where $R_s$ is the solution resistance, intrinsic resistance, electrolyte ions resistance and/or the contact resistance between the active material and current collector, $R_{ct}$ is the charge transfer resistance, and W is the Warburg resistance. The equivalent circuit of FIG. 9B further includes the capacitance, $C_{dl}$, which represents the double layer capacitor. For real porous nanocarbon electrodes, the Nyquist plot can be separated into three parts: a high frequency region, a medium frequency region and a low frequency region. In the high frequency region, the Nyquist plot is a semicircle and the real axis intercept is the equivalent series resistance (ESR). ESR is equal to the difference between the solution resistance ($R_s$) and charge transfer resistance ($R_{ct}$) of the Nyquist plot. The width of the semicircle impedance loop represents the charge transfer resistance in the electrode materials.

As shown in FIG. 9A, all four curves have nearly the same first point of intersection with the horizontal axis because all measurements were carried out using 1 M $Na_2SO_4$ as the electrolyte and the same assembly method was used for all JPW porous nanocarbon samples; i.e., the resistance caused by the electrolyte and the contact resistance of these electrodes were similar. The second intersection points of the semicircles and the horizontal axis show the inner resistances (ESR). In general, ideal porous nanocarbon electrodes should have a vertical straight line perpendicular to the horizontal coordinate. In the low frequency region, the Nyquist plot is a straight line for an EDLC. A more vertical line shows a more ideal capacitive behavior. The inset graph of FIG. 9A shows that there is an apparent semicircle in the high frequency range in the EIS spectrogram of sample JF 9, which is caused by the electric double-layer capacitance corresponding to the charge transfer resistance. The $R_s$ and $R_{ct}$ resistance values of sample JF 9 were 4.72Ω and 0.76Ω, respectively, indicating a low system resistance and good charge transfer rate. The oblique line of the low frequency region represents the ion diffusion resistance, and the degree of ideal supercapacitors is 90°. It can be seen that there is an almost vertical line for sample JF 9 in the low frequency region, demonstrating that sample JF 9 had ideal capacitive behaviors when compared against those of samples JF 8, JF 7 and JF 6.

Figure 10:
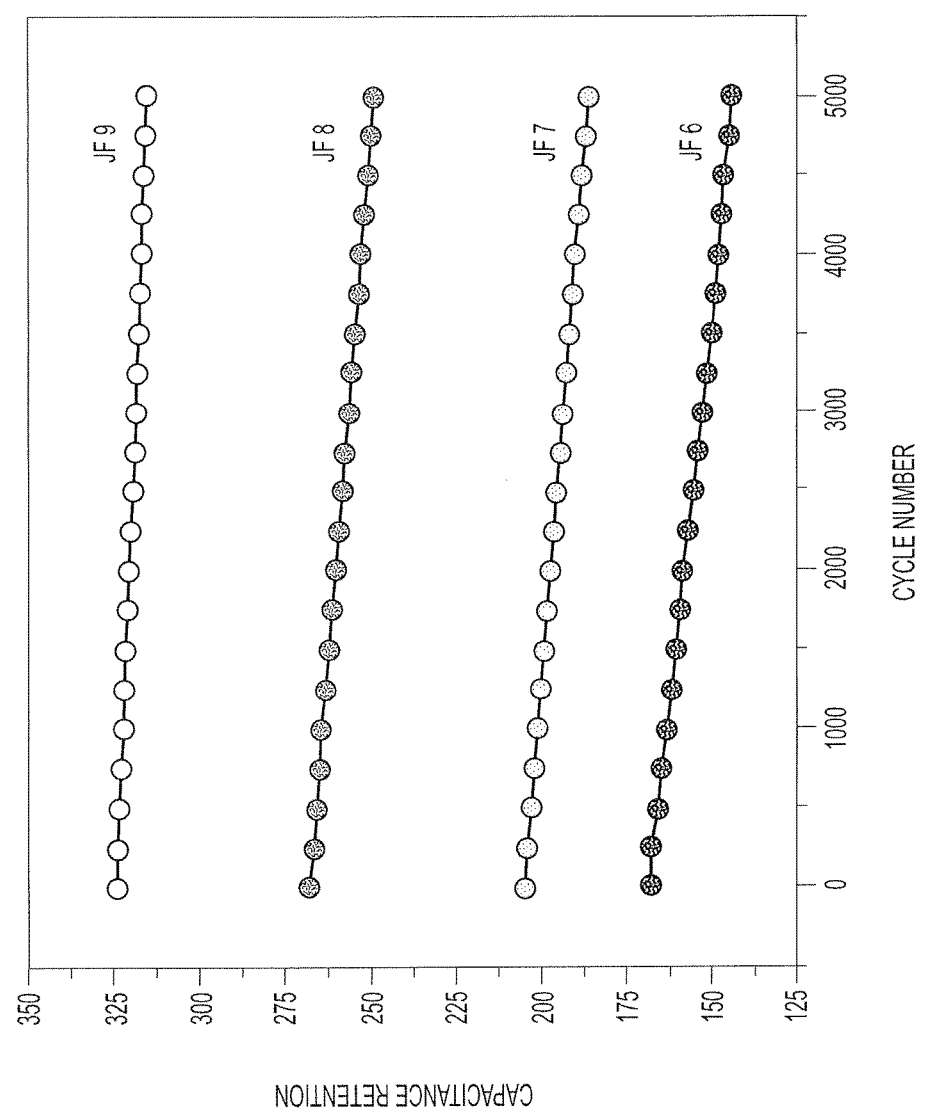
FIG. 10 compares plots of cyclic stability for samples JF 6, JF 7, JF 8 and JF 9.

The primary advantage of supercapacitors is the long-term cycle duration. FIG. 10 shows the cyclic stability of samples JF 6, JF 7, JF 8 and JF 9 tested at a current density of 1 A/g for 5000 cycles within a potential window from 0 V to 0.68 V in 1 M $Na_2SO_4$ electrolyte using the standard three electrode systems. As shown in FIG. 10, sample JF 9 has no specific capacitance loss occurring after 5000 cycles, whereas samples JF 6, JF 7 and JF 8 each show a small loss in specific capacitance after 3500 cycles. The capacitance retention of sample JF 9 is 93%, which strongly demonstrates the excellent electrochemical stability of the JF 9 electrode material. This excellent performance is closely related to the higher conductivity of the JF 9 porous nanocarbon as well as its high surface area and reasonable pore size distribution.

Figure 11:
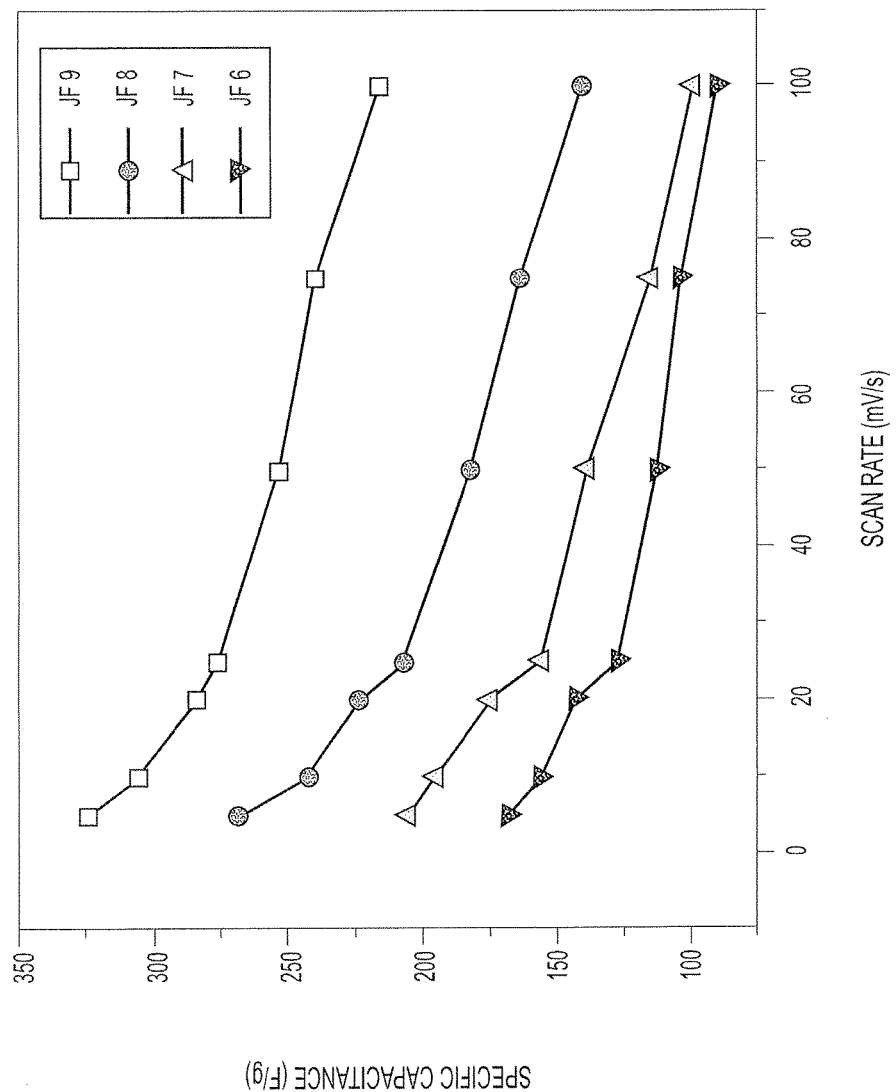
FIG. 11 compares plots of specific capacitance as a function of scan rate for samples JF 6, JF 7, JF 8 and JF 9.

As shown in the cyclic voltammogram of FIG. 11, the scan rate plays an important role in the specific capacitance of the JPW porous nanocarbon electrode material. FIG. 11 displays results for different scan rates (5, 10, 20, 25, 50, 75 and 100 mV/s) with different specific capacitance values for the samples JF 6, JF 7, JF 8 and JF 9. All samples show a higher specific capacitance higher at a low scan rate (5 mV/s). Thus, the specific capacitance is seen to increase as the scan rate decreases, in accordance with the results shown in Table 2. Sample JF 9 has a higher specific capacitance at a lower scan rate, with the specific capacitance gradually dropping after the scan rate of 75 mV/s. This can be explained by the different values of BET surface area playing a significant role; i.e., sample JF 9 has a high microporous and mesoporous range, which explains the interface reaction between the electrode and electrolyte ions. The ion diffusion between the electrode and electrolyte interface is much faster for sample JF 9 than for the other porous nanocarbon samples.

For purposes of comparison, the specific capacitance ($C_{sp}$) of electrode materials prepared via activation methods from various conventional natural waste organic precursors are shown in Table 3 below. The JPW porous nanocarbon electrode (JF 9) shows a high capacitive performance when compared against these conventional carbon precursor sources.

TABLE 3

Specific Capacitance From Various Carbon Precursor Sources

| Biomass precursors | Activating agent | $S_{BET}$ ($m^2$/g) | $C_{sp}$ (F/g) | Current density (A/g) | Electrolyte |
|---|---|---|---|---|---|
| Sugarcane bagasse | $ZnCl_2$ | 1788 | 300 | 0.25 | 1M $H_2SO_4$ |
| Rice husk | $ZnCl_2$ | 1442 | 243 | 0.05 | 6M KOH |
| Human hair | KOH | 1104 | 264 | 0.25 | 6M KOH |
| Scrap waste tires | $H_3PO_4$ | 563 | 106 | 1 | 6M KOH |
| Paulownia flower | KOH | 1471 | 297 | 1 | 1M $H_2SO_4$ |
| Corn cob | $HNO_3$ | 543 | 221 | 0.5 | 0.5M $H_2SO_4$ |
| Jack fruit peel waste | $H_3PO_4$ | 1585 | 324 | 1 | 1M $Na_2SO_4$ |

It is to be understood that the method of making a porous carbon electrode is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a porous nano-carbon electrode from biomass, comprising the steps of:
   heating a volume of jackfruit (*Artocarpus heterophyllus*) peel under vacuum at a temperature of 400 C for 4 hours to produce precursor carbon;
   mixing the precursor carbon with phosphoric acid ($H_3PO_4$) at a ratio of 1:4 of precursor carbon to phosphoric acid to form a mixture;
   stirring the mixture;
   drying the mixture;

heating the mixture to yield porous nanocarbon, the heating is at a temperature of 900° C. for about 4 hours under vacuum, the pores have interconnected cylindrical configurations, wherein the porous nanocarbon has a Brunauer-Emmett-Teller (BET) surface area of 1585 m$^2$/g a specific capacitance of 320 F/g at 1 A/g and a total pore volume of 0.965 cm$^3$/g;

mixing the porous nanocarbon with a binder, acetylene black and an organic solvent to form a paste; and coating a strip of nickel foil with the paste to form a porous carbon electrode.

2. The method of making a porous nano-carbon electrode from biomass as recited in claim 1, further comprising the step of drying the volume of jackfruit (*Artocarpus heterophyllus*) peel prior to the step of heating the volume of jackfruit (*Artocarpus heterophyllus*) peel under vacuum.

3. The method of making a porous nano-carbon electrode from biomass as recited in claim 2, wherein the step of drying the volume of jackfruit (*Artocarpus heterophyllus*) peel comprises drying the volume of jackfruit (*Artocarpus heterophyllus*) peel for a period of about 24 hours at a temperature of about 80° C.

4. The method of making a porous nano-carbon electrode from biomass as recited in claim 1, wherein the step of stirring the mixture comprises stirring the mixture for about 3 hours at a temperature of about 80° C.

5. The method of making a porous nano-carbon electrode from biomass as recited in claim 4, wherein the step of drying the mixture comprises drying the mixture for about 24 hours at a temperature of about 80° C.

6. The method of making a porous nano-carbon electrode from biomass as recited in claim 1, further comprising the step of drying the porous nanocarbon prior to the step of mixing the porous nanocarbon with the binder, the acetylene black and the organic solvent.

7. The method of making a porous nano-carbon electrode from biomass as recited in claim 6, wherein the step of drying the porous nanocarbon comprises drying the porous nanocarbon at a temperature of about 80° C. for about 24 hours.

8. The method of making a porous nano-carbon electrode from biomass as recited in claim 1, wherein the step of mixing the porous nanocarbon with the binder, the acetylene black and the organic solvent comprises mixing the porous nanocarbon with a poly(vinylidenedifluoride) binder, the acetylene black, and an n-methyl pyrrolidinone organic solvent.

* * * * *